US008069440B2

(12) United States Patent
Tirumalai et al.

(10) Patent No.: US 8,069,440 B2
(45) Date of Patent: Nov. 29, 2011

(54) ADAPTIVE CODE THROUGH SELF STEERED EXECUTION

(75) Inventors: Partha P. Tirumalai, Fremont, CA (US); Kurt J. Goebel, Dayton, OH (US); Yonghong Song, Belmont, CA (US); Spiros Kalogeropulos, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 1433 days.

(21) Appl. No.: 11/588,639

(22) Filed: Oct. 27, 2006

(65) Prior Publication Data

US 2008/0127134 A1 May 29, 2008

(51) Int. Cl.
*G06F 9/45* (2006.01)
*G06F 9/44* (2006.01)

(52) U.S. Cl. ............... 717/151; 717/140; 717/169
(58) Field of Classification Search ............... None
See application file for complete search history.

(56) References Cited

U.S. PATENT DOCUMENTS

| | | | |
|---|---|---|---|
| 6,651,246 B1 | 11/2003 | Archambault et al. | |
| 6,654,954 B1 * | 11/2003 | Hicks | 717/162 |
| 6,880,045 B2 | 4/2005 | Pong et al. | |
| 6,938,130 B2 | 8/2005 | Jacobson et al. | |
| 7,395,531 B2 | 7/2008 | Eichenberger et al. | |
| 7,426,724 B2 * | 9/2008 | Kilgard et al. | 717/151 |
| 7,530,069 B2 | 5/2009 | Kawahara et al. | |
| 7,543,282 B2 * | 6/2009 | Chou | 717/151 |
| 7,818,729 B1 * | 10/2010 | Plum et al. | 717/140 |
| 7,853,934 B2 * | 12/2010 | Partamian | 717/140 |
| 2004/0049667 A1 * | 3/2004 | McCormick et al. | 712/233 |
| 2006/0026575 A1 * | 2/2006 | Cabillic et al. | 717/140 |
| 2006/0026580 A1 * | 2/2006 | Cabillic et al. | 717/151 |
| 2007/0050762 A1 * | 3/2007 | Chen et al. | 717/169 |
| 2008/0163185 A1 * | 7/2008 | Goodman | 717/151 |

OTHER PUBLICATIONS

"Design and evaluation of dynamic optimizations for a Java just-in-time compiler", Suganuma et al., Jul. 2005, pp. 732-785, <http://delivery.acm.org/10.1145/1080000/1075386/p732-suganuma.pdf>.*

"Compiler optimization of embedded applications for an adaptive SoC architecture", Hardnett et al., Oct. 2006, pp. 312-322, <http://delivery.acm.org/10.1145/1180000/1176798/p312-hardnett.pdf>.*

(Continued)

*Primary Examiner* — Thuy Dao
(74) *Attorney, Agent, or Firm* — Rory D. Rankin; Meyertons, Hood, Kivlin, Kowert & Goetzel, P.C.

(57) ABSTRACT

A method and mechanism for producing and executing self-steering program code. A method comprises analyzing program code and identifying portions which may be amenable to optimization. Having identified such a portion of code, at least one optimized version of the identified code is added to the program code. Additionally, a selection mechanism is added to the program code which is configured to select between two or more versions of the portion of code during runtime. The modified program code is then compiled with the added optimized version and the selection mechanism. During execution, monitoring of behavior of the code may be enabled or disabled. Based upon such monitored behavior, a different version of the code may be selected for execution. Various optimized versions may be selected for execution in a manner which takes advantage of the current behavior of the program.

12 Claims, 8 Drawing Sheets

OTHER PUBLICATIONS

"Dynamic code management: improving whole program code locality in managed runtimes", Huang et al., Jun. 2006, pp. 133-143, <http://delivery.acm.org/10.1145/1140000/1134779/p133-huang.pdf>.*

"ACME: adaptive compilation made efficient", Cooper et al., Jul. 2005, pp. 69-77, <http://delivery.acm.org/10.1145/1070000/1065921/p69-cooper.pdf>.*

Song, Y., et al; "Design and Implementation of a Compiler Framework for Helper Threading on Multi-Core Processors;" IEEE PACT 2005, (Sep. 2005); pp. 99-109.

Damron, P., et al; "Hybrid Transactional Memory"; ASPLOS XII; San Jose, CA (2006); http://www.princeton.edu/~asplos06/tprogram.html.

Su, E., et al; "Compiler Support of the Workqueuing Execution Model for Intel SMP Architectures"; Fourth European Workshop on OpenMP (EWOMP), (2002).

Zhong, H., et al; "Uncovering Hidden Loop Level Parallelism in Sequential Applications"; In Proc. of the 14th International Symposium on High-Performance Computer Architecture; (2008).

* cited by examiner

ADAPTIVE CODE THROUGH SELF STEERED EXECUTION

BACKGROUND OF THE INVENTION

1. Field of the Invention

The invention relates to computing systems and, more particularly, to multithreaded processing systems.

2. Description of the Related Art

Modern optimizing compilers have the ability to do a large number of complex optimizations. Some types of optimization are universal and may improve performance in virtually all cases. However, in other cases, the benefit of optimizations, or the manner in which they need to be applied for maximum benefit, depends on the target program's behavior. In order to address optimizations that may depend on a target program's behavior, various approaches have been used.

One approach that has been used to optimize code in view of a program's behavior is "static analysis". FIG. 1 depicts one embodiment of the static analysis approach. Using this approach, a source program (block 100) is created. The compiler analyzes the program to determine its behavior and optimizes accordingly (block 110). During the analysis, the compiler determines or guesses at program behavior and makes optimizations. Finally, an optimized executable is produced (block 120). This approach may be relatively easy for the user compared to some other approaches, but is limited in applicability because static analysis generally cannot accurately determine program behavior in many cases. Therefore, optimization opportunities may not be fully exploited.

FIG. 2 depicts another compiler optimization approach sometimes utilized that is referred to as "profile feedback". The profile feedback approach acknowledges some of the deficiencies of the static analysis approach, and utilizes a "training run" to learn about a target program's behavior. Using this approach, developers build a training version of a program. As shown in FIG. 2, a source program is provided (block 200) and compiled (block 210). The resulting executable is built for the sole purpose of training. Training runs are then performed (block 220) using training inputs (block 230). After training, the source code is re-built (block 240) and a new executable created (block 250) which is optimized based upon the training runs. While a training run may help the compiler learn about the program's behavior, the build process requires extra steps. For this reason, many developers avoid profile feedback. In addition, training input might not represent actual input. Further, optimizations are fixed in the final executable and do not adapt to variations in program behavior.

Yet another approach used for optimizing program code is "run time optimization". Using the run time optimization approach, a program's behavior is monitored during runtime. Based upon the observed behavior, code may be optimized and re-optimized as desired. FIG. 3 illustrates one embodiment of this approach. As shown, a source program (block 300) is compiled (block 310) and training runs may be performed (block 320). Such training runs may utilize training input (block 330). Finally, an executable is produced (block 340). During runtime (block 350), a monitor (block 360) is utilized to monitor the execution. Based upon this runtime monitoring, the code may be re-compiled (block 370) in an effort to further optimize the code. Re-compilation produces a new executable (block 340). The process (350, 360, 370) may then be repeated as desired.

In this run time optimization approach, the original executable may be built with a traditional compiler. While the run time optimization approach may provide for some adaptability during runtime, it does have some drawbacks. For example, monitoring introduces additional overhead. Further, because run time optimization is designed to work on any executable, it doesn't know what parts to monitor for a given behavior in an executable. Consequently, it may end up monitoring many things in many places that are not particularly relevant. Still further, re-compilation is very complex and resource-hungry. Another potential problem for run time optimization is that certified code may be modified during execution. Consequently, the executable can no longer be trustworthy. For these and other reasons, traditional run time optimization may not be desirable.

In view of the above, effective methods and mechanisms for improving code optimization are desired.

SUMMARY OF THE INVENTION

Methods and mechanisms for producing and executing self-steering program code are contemplated.

One embodiment of a method is contemplated which comprises analyzing program code and identifying portions which may be amenable to optimization. Having identified such a portion of code, at least one optimized version of the identified code is added to the program code. Additionally, a selection mechanism is added to the program code which is configured to select between two or more versions of the portion of code during runtime. The modified program code is then compiled with the added optimized version and the selection mechanism.

During execution of the compiled program code, monitoring of behavior of the code may be enabled or disabled. In one embodiment, various factors or characteristics of the identified portion may be monitored for behavior. Based upon such monitored behavior, a different version of the code may be selected for execution. Various optimized versions may be selected for execution in a manner which takes advantage of the current behavior of the program.

These and other embodiments, variations, and modifications will become apparent upon consideration of the following description and associated drawings.

While the invention is susceptible to various modifications and alternative forms, specific embodiments are shown herein by way of example. It is to be understood that the drawings and description included herein are not intended to limit the invention to the particular forms disclosed. Rather, the intention is to cover all modifications, equivalents and alternatives falling within the spirit and scope of the present invention as defined by the appended claims.

DETAILED DESCRIPTION

Figure 1:
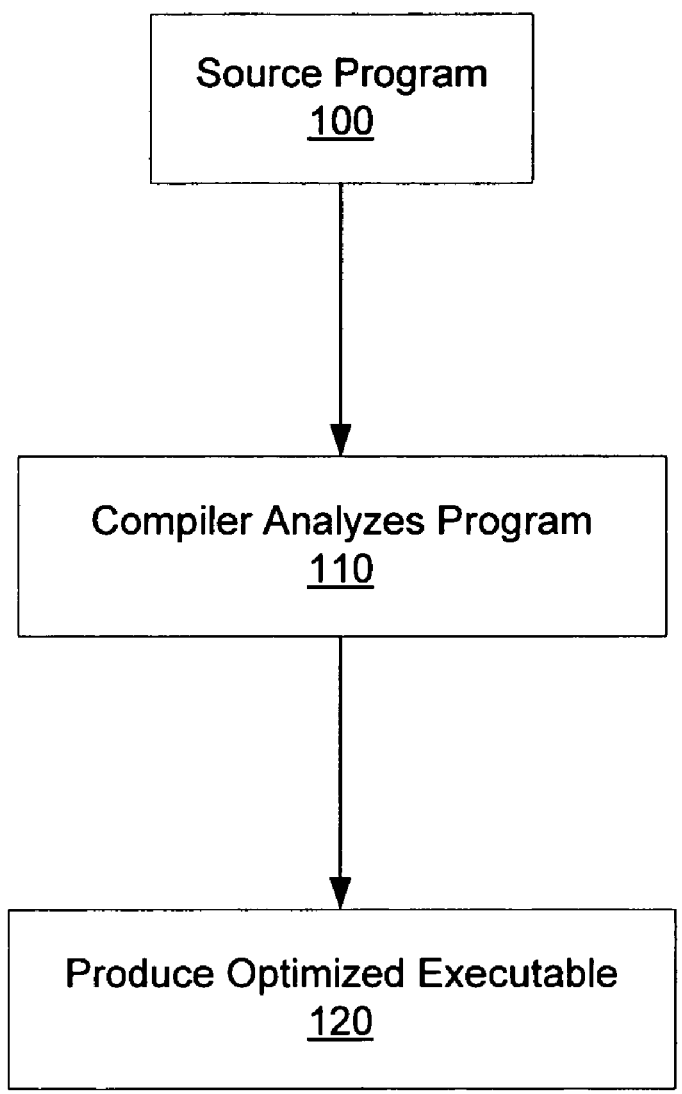
FIG. 1 illustrates one embodiment of a method for optimizing program code.
Figure 2:
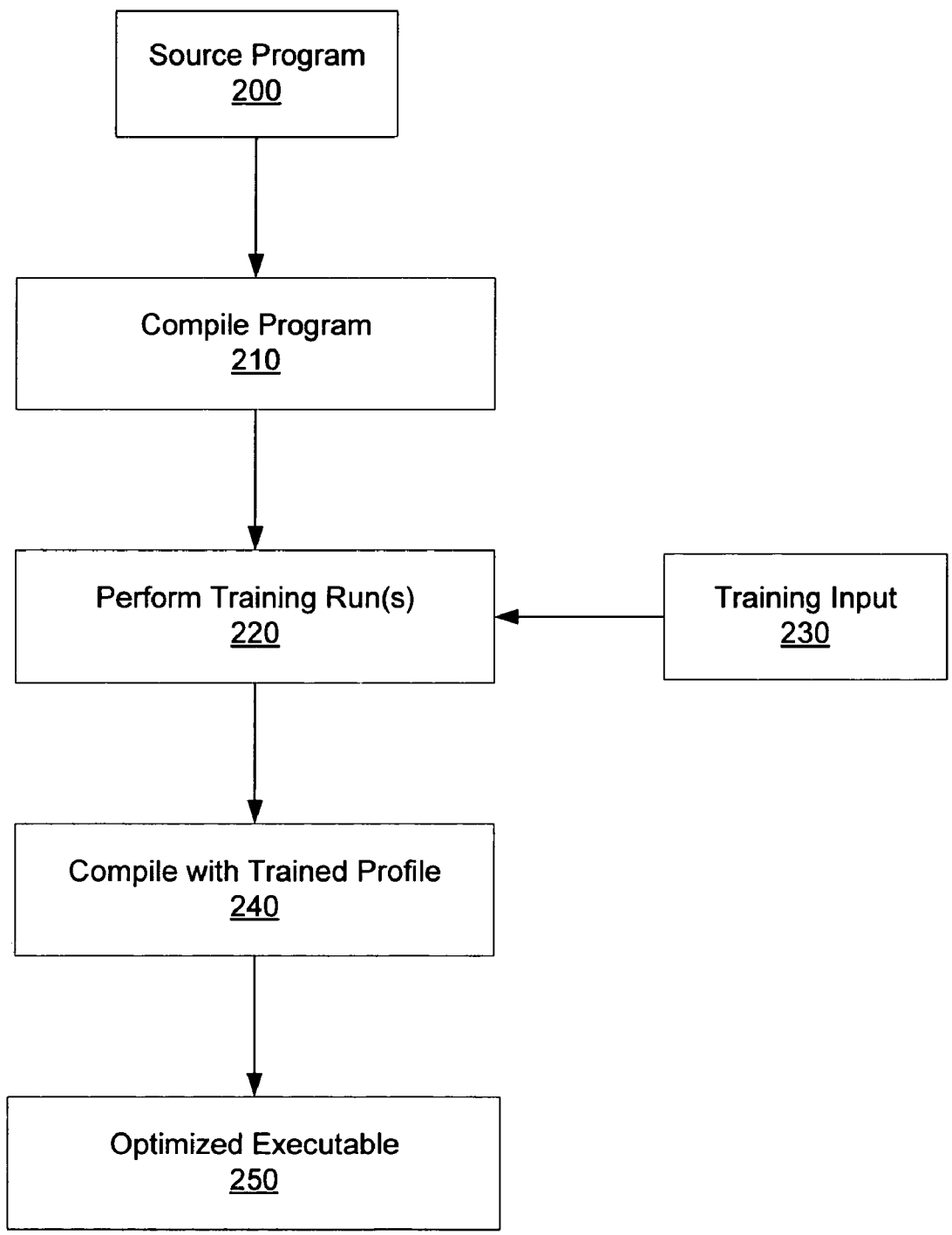
FIG. 2 illustrates one embodiment of a method for optimizing program code.
Figure 3:
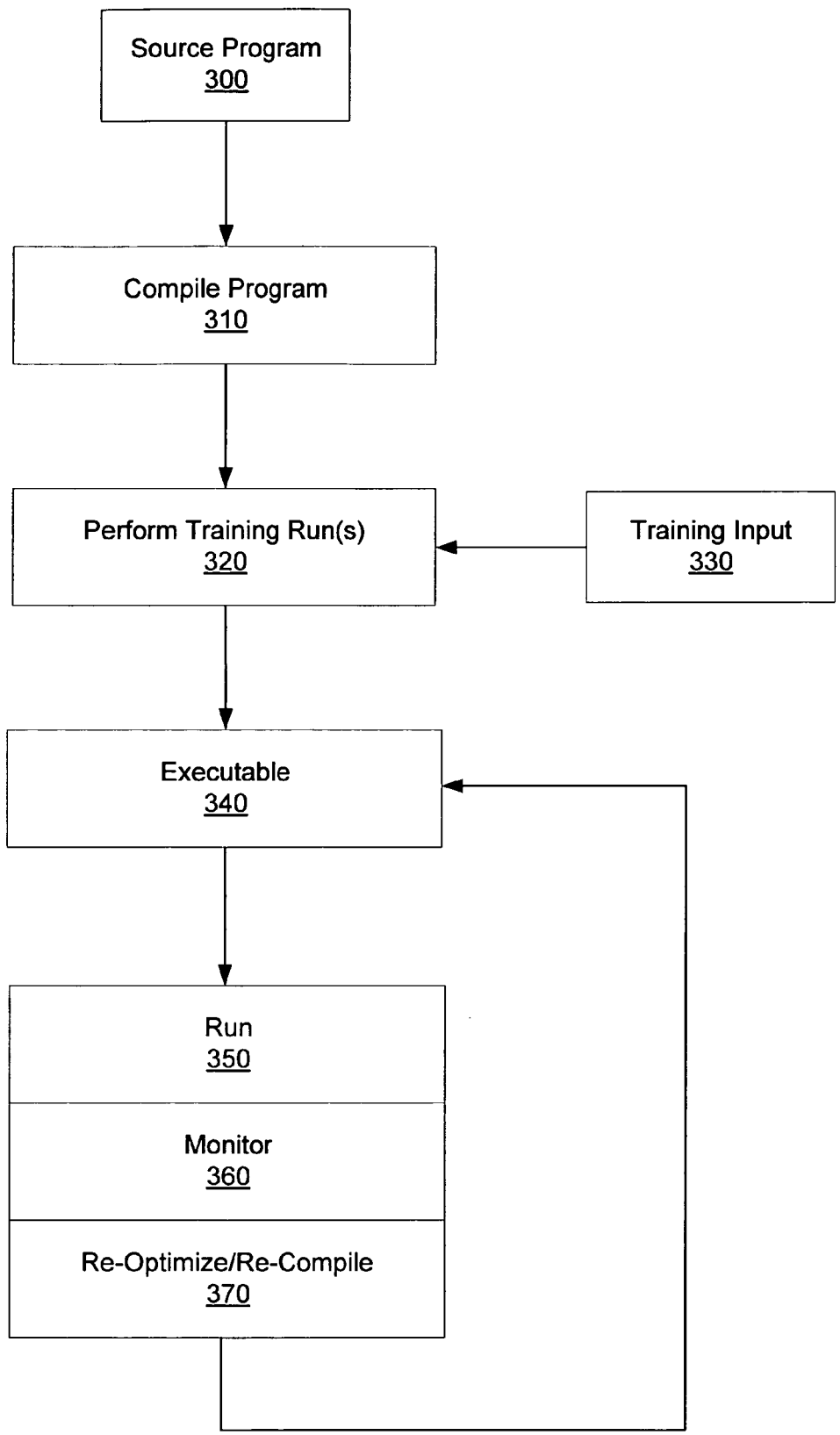
FIG. 3 illustrates one embodiment of a method for optimizing program code.
Figure 4:
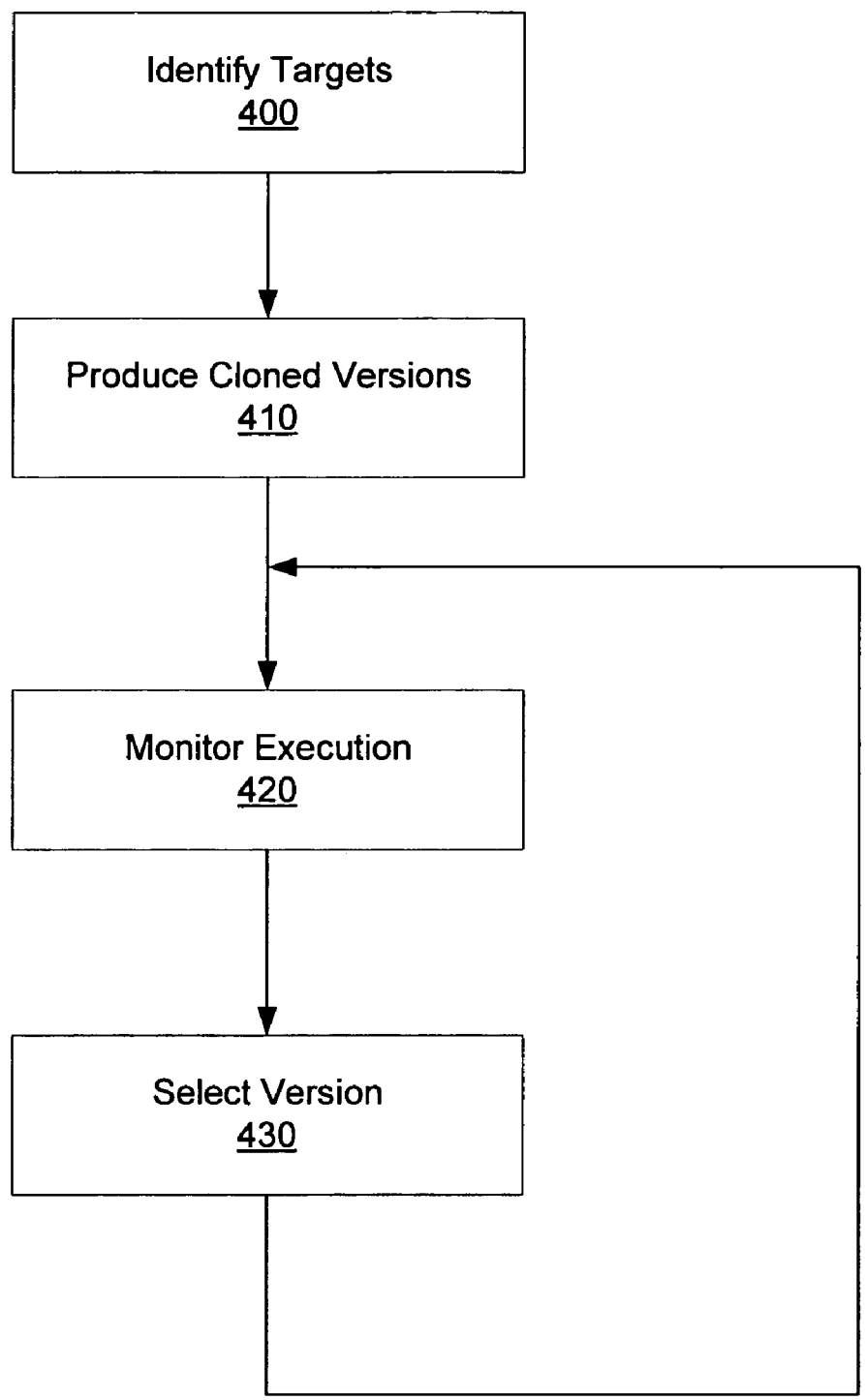
FIG. 4 illustrates one embodiment of a method for executing self-steering code.

Turning now to FIG. 4, an overview of one embodiment of a method for producing self-steering code is depicted. Generally speaking, self-steering code is code which is produced in a manner which enables selecting for execution one of two or more portions of code, each of which are designed to perform a given function with differing types of optimization (if any). As shown in the example, the method includes analyzing program code to identify (block 400) one or more "targets" or candidates for optimization. As will be discussed further, below, such targets may generally comprise portions of code which lend themselves to one or more optimization techniques. Having identified suitable targets, cloned versions of each target are then produced (block 410). Such cloned versions are alternative versions of the corresponding target code which have been optimized in one way or another. Each of these cloned versions are then included in a compiled versions of the code.

In addition to the above cloned version(s), a mechanism is included in the code which allows for selecting among the original and/or cloned versions during runtime. Additionally, monitoring code may be included which may monitor execution and indicate which of the versions are to be chosen for execution. Having created an executable which includes multiple versions of one or more portions of code, execution and monitoring (block 420) begins. During execution, monitoring may be performed to determine whether a given condition is present. Should the condition be detected, a particular version of a given code portion may be selected for execution. In this manner, runtime optimization may be achieved without requiring recompilation. It is noted that in various embodiments, monitoring may be enabled or disabled as desired. In one embodiment, the monitoring code is itself included as one of the cloned versions.

Figure 5:
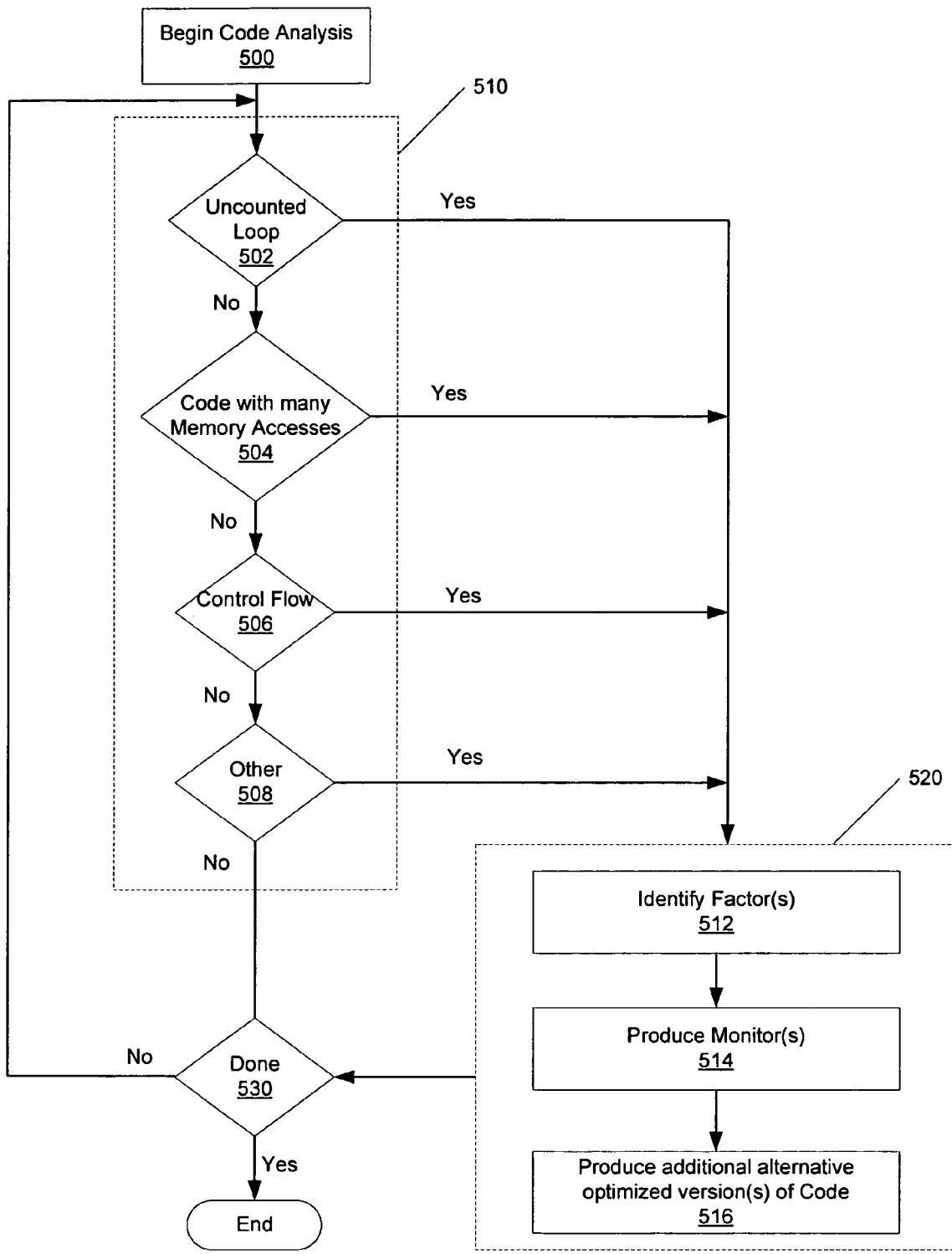
FIG. 5 illustrates one embodiment of a method for producing self-steering code.

FIG. 5 illustrates one embodiment of a method for producing code in accordance with the above description. In the embodiment of FIG. 5, an analysis of program code is initiated (block 500). During the analysis, various code segments may be identified as being suitable for possible optimization. As shown in block 510, various examples of such code segments are depicted. In a given embodiment, any one or more of the depicted, or other, types of code segments may be considered suitable for optimization. Generally speaking, these code segments may have particular characteristics (though not necessarily). For example, such code segments may include one or more of the following:

functions, or code segments that can be outlined code expected to be frequently executed during a run code that is deeply nested, analyzed, or shown as hot in a training run code likely to vary in some behavior during the run code that exhibits behavior variations that warrant different optimization strategies For example, should an uncounted loop (decision block 502) be identified, it may be considered a suitable candidate for optimization. An uncounted loop is a loop whose iteration depends on a condition computed within the loop. Uncounted loops are those whose number of iterations are not necessarily predetermined. For example, a "while loop" is an example of an uncounted loop. Those skilled in the art will appreciate that one method of optimizing such loops involves loop unrolling. However, whether or not loop unrolling is advantageous may generally depend on the behavior of a given program (e.g., if the trip count is relatively large).

Another possible type of code that may be suitable for optimization is a code segment or portion that includes many memory accesses (decision block 504). In some cases, it may be advantageous to perform prefetching of data for such code segments. However, whether prefetching is appropriate again depends on the behavior of the program. For example, if the given code segment is experiencing a relatively high cache miss rate, then prefetching may be appropriate. If the miss rate is relatively low, then prefetching may not be appropriate.

Still another type of code which may be suitable is code including control flow mechanisms (decision block 506) which can be optimized. For example, the control flow of a given portion of code may be analyzed. Such analysis may reveal certain code is unreachable or dead. In such a case, removal of the dead code may be appropriate. Numerous other techniques are possible as well—such as techniques for avoiding particular branches or handling irreducible loops. All such techniques are possible and are contemplated. Also shown in FIG. 5 is an indication (decision block 508) that any other type of code may be selected as a target/candidate for self-steered execution. It is noted that the factors considered during monitoring may include any number of factors.

Assuming target code has been identified as shown in block 510, additional code is produced for supporting self-steered execution. In the example shown, various activities associated with this additionally produced code are depicted in block 520. Generally this additional code may be produced by the compiler or an associated program. For example, one or more factors suitable for monitoring or otherwise considering in relation to the target code is identified. For example, in the case of an unrolled loop the trip count may represent such a factor. Alternatively, if a contemplated optimization is prefetching of data, then a cache miss rate may represent such a factor. Any suitable factor appropriate for a given type of code and/or optimization may be considered. Having identified such a factor(s) (block 512), monitoring code may be produced (block 514) which monitors such factor(s). In addition, one or more alternative versions of the same code portion may be produced (block 516) which are optimized in one way or another.

For example, in the case of a portion of code which includes many memory accesses, an optimized version may be produced which includes prefetching of data. Another version may be produced which does not include prefetching of data (e.g., the original version). Still further, an optimized or non-optimized version may be produced which includes the monitoring code. Having produced the desired code, the process may continue the analysis of the program code until done (decision block 530). An executable may then be created based upon the code which has been produced.

Figure 6:
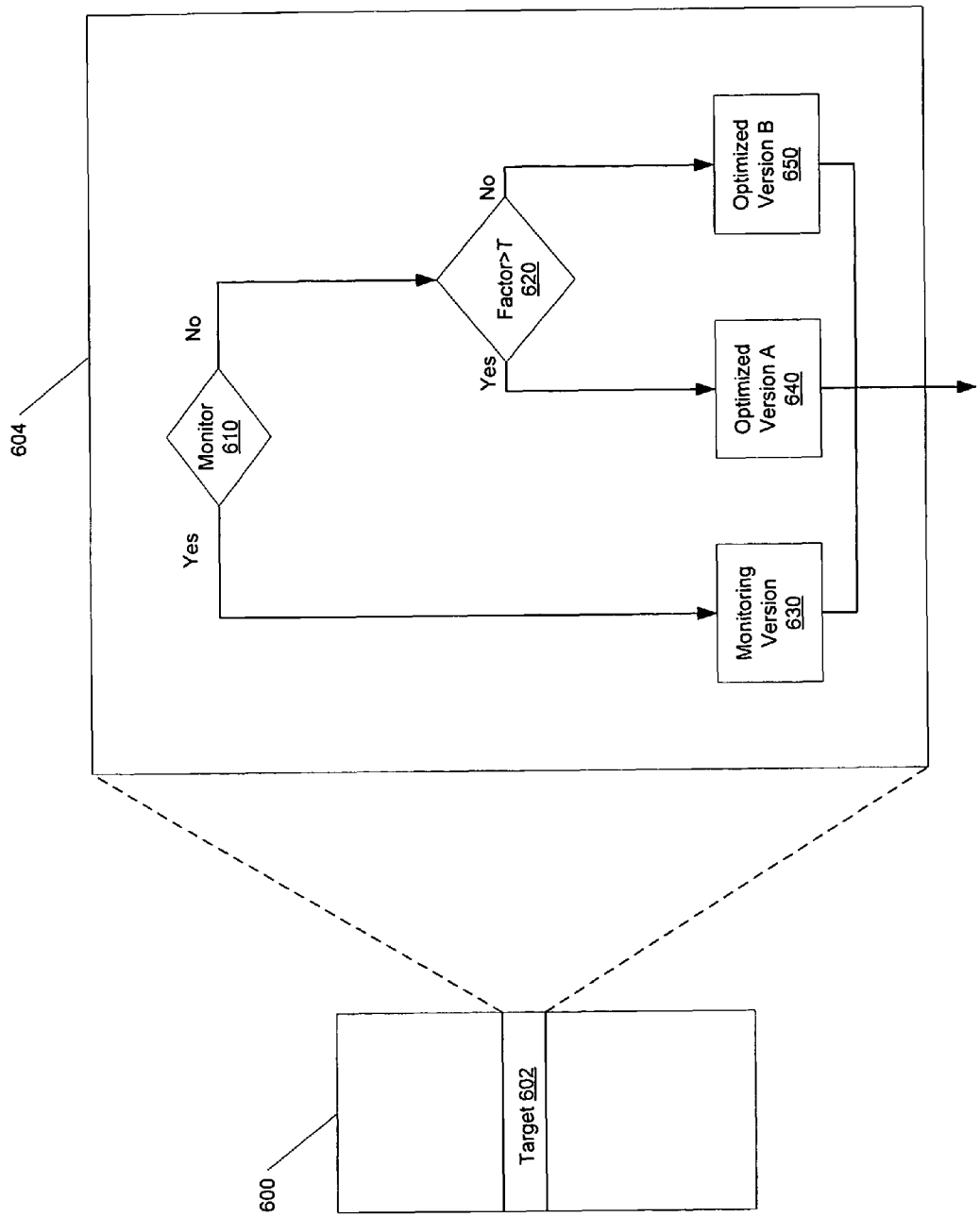
FIG. 6 depicts one embodiment of self-steering code.

Turning now to FIG. 6, one embodiment of the operation of self-steering code is shown. In the example shown, program code 600 has been modified according to a method similar to that described above in relation to FIG. 5. During the analysis and compilation process, target code 602 was identified as a candidate for self-steered optimization. Block 604 depicts control flow of the target code 602 produced by the previously described methods. As shown, code (decision block 610) has been introduced which enables monitoring to be either enabled or disabled. If monitoring is enabled, then a monitoring version (block 630) of the target code 602 is executed during runtime. Such a monitoring version 630 could, for example, represent an un-optimized version of code 602 with monitoring code added. During such monitoring, one or more factors or conditions may be monitored for the target code 602. For example, a cache miss rate may be monitored and data corresponding to such monitored conditions may be maintained (e.g., stored). Whether monitoring is enabled at any given time may be user determined (e.g., via register write, command line switch, etc.).

After monitoring, or when monitoring is otherwise not to be performed, a determination may be made as to which of two or more versions of the code 602 are to be utilized during runtime. The decision (decision block 620) as to which version is used may be based upon data resulting from previous monitoring. For example, the decision may be made based upon whether a monitored factor (e.g., cache miss rate) exceeds some threshold (T). If the condition is met (i.e., Factor>T), then one version (640) of the code 602 may be used. If the condition is not met, then a different version (650) of the code 602 may be used. In this manner, different optimized versions of program code may be utilized depending upon the behavior of the program, and without re-compilation of the program. In various embodiments, the self-steering mechanism may be configured such that monitoring is performed for some predetermined period of time. After monitoring is turned off, a selected version of the code may then execute for some given period of time, after which the selected version is turned off and the monitoring version is turned back on. Accordingly, monitoring and execution of different versions of selected code may be performed dynamically during runtime.

In the following example, an illustration is provided which describes the dynamic behavior of a program and conclusions reached based upon observed behavior over a three day period.

Day 1

| Build/Run 1 | |
|---|---|
| Md5-b $ build "-xprefetch=no" | //Build without prefetch |
| main.c: | |
| dist.c: | |
| md5-b $ time lsq < ../input.as > /dev/null | //Run & time |
| real    1m31.29s | |
| user    1m31.24s | |
| sys     0m0.03s | |
| Build/Run 2 | |
| Md5-b $ build "-xprefetch=yes" | //Build with prefetch |
| main.c: | |
| dist.c: | |
| md5-b $ time lsq < ../input.as > /dev/null | //Run & time |
| real    1m31.38s | |
| user    1m31.33s | |
| sys     0m0.02s | |

In the above example on day 1, an executable is first built and run without prefetching enabled. Subsequently, an executable is built and run with prefetching enabled. Based upon the runtime statistics, the conclusion is reached that prefetching makes essentially no difference for this program. On a second day, the following is performed.

Day 2

| Build/Run 1 | |
|---|---|
| Md5-b $ build "-xprefetch=no" | //Build without prefetch |
| main.c: | |
| dist.c: | |
| md5-b $ time lsq < ../input.wd > /dev/null | //Run & time |
| real    2m14.47s | |
| user    2m14.43s | |
| sys     0m0.00s | |
| Build/Run 2 | |
| Md5-b $ build "-xprefetch=yes" | //Build with prefetch |
| main.c: | |
| dist.c: | |
| md5-b $ time lsq < ..//input.wd > /dev/null | //Run & time |
| real    2m37.01s | |

| -continued | |
|---|---|
| user    2m37.00s | |
| sys     0m0.01s | |

In the above example on day 2, an executable is first built and run without prefetching enabled. Subsequently, an executable is built and run with prefetching enabled. Based upon the runtime statistics, the conclusion is reached that prefetching can hurt this program—by about 17%. On a third day, the following is performed.

Day 3

| Build/Run 1 | |
|---|---|
| Md5-b $ build "-xprefetch=no" | //Build without prefetch |
| main.c: | |
| dist.c: | |
| md5-b $ time lsq < ../input.tl > /dev/null | //Run & time |
| real    0m49.31s | |
| user    0m49.25s | |
| sys     0m0.02s | |
| Build/Run 2 | |
| Md5-b $ build "-xprefetch=yes" | //Build with prefetch |
| main.c: | |
| dist.c: | |
| md5-b $ time lsq < ../input.tl > /dev/null | //Run & time |
| real    0m25.70s | |
| user    0m25.65s | |
| sys     0m0.02s | |

In the above example on day 3, an executable is first built and run without prefetching enabled. Subsequently, an executable is built and run with prefetching enabled. Based upon the runtime statistics, the conclusion is reached that prefetching can help this program—by about 2×.

Of course the above examples illustrate how the dynamic behavior of a program may change on a day to day basis and affect conclusions which are reached. Day 1's run had a mix of behaviors both favorable and unfavorable to prefetch—the two essentially canceled each other out. Day 2 and Day 3 runs were skewed to the unfavorable and favorable sides, respectively. In practice, a conclusion reached on the first day is rarely retested later. Consequently, whatever happens then may be used to decide how this program will be built for the foreseeable future. The self-steering methods and mechanism discussed above may serve to avoid such problems.

In view of the above, a variety of advantages may be realized through the use of self-steered execution. Self-steering makes a static binary capable of adapting to variation in execution behavior, and pre-compilation allows the choice of complex optimizations that would be very difficult to do at run time. Further, compute resources are saved because there is no recompilation on every execution of the application. Still further, greater trust may be maintained because certified code is not modified by an external entity during execution.

Figure 7:
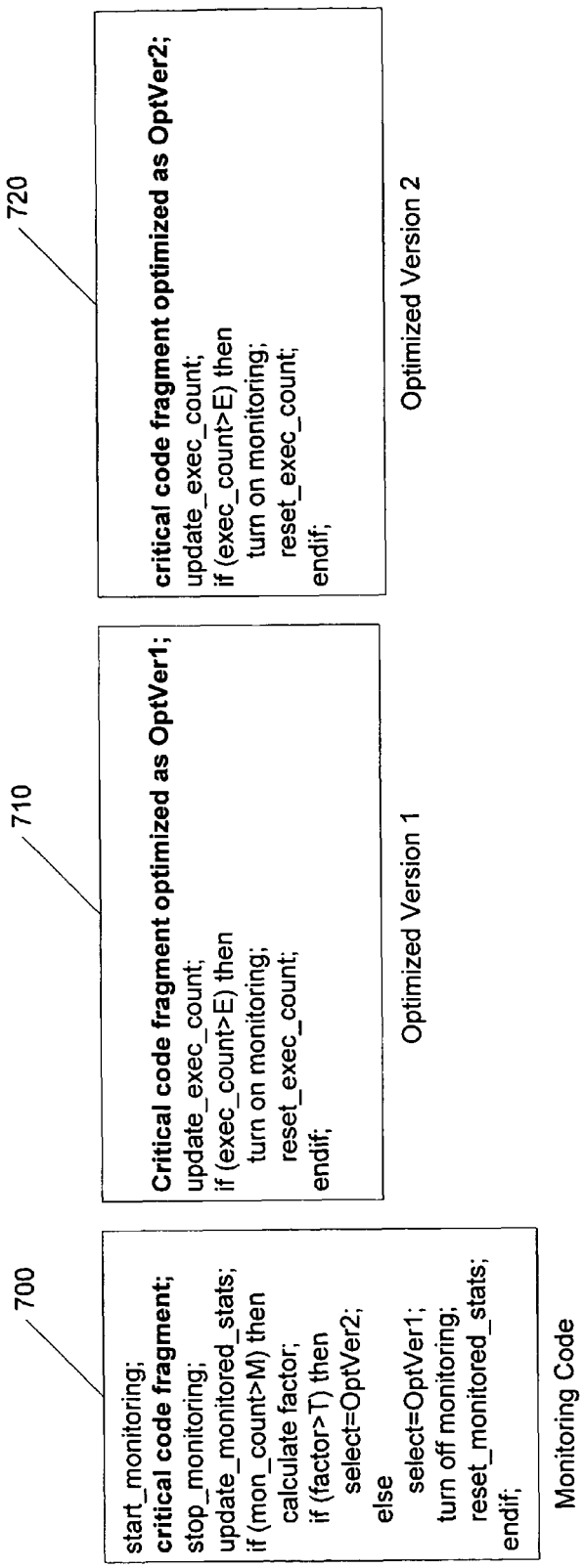
FIG. 7 illustrates one embodiment of self-steering pseudo-code.

FIG. 7 illustrates pseudo-code depicting one example of how the above described mechanism may be implemented. In the example shown, three versions of selected code for a target location have been produced. A monitoring version 710, a first optimized version 720, and a second optimized version 730 are all included within the code. Each of these versions includes the target code of interest (critical code). The monitoring version may include either an optimized or an un-optimized version of the critical code. At program start, execution may begin with any of the versions. In one embodiment, execution begins with the monitoring version 710. In this example, the monitoring version includes a version of the critical code surrounded by code to track the identified factor for the target.

In the embodiment shown, the monitoring version 710 is executed M times during which time an execution count (mon_count) is maintained. It is noted that the execution count may represent cycles, or any other suitable period desired. During or after each execution of the critical code, monitored data may be stored or otherwise maintained. After reaching the count M, the accumulated monitored data is analyzed and a factor is calculated (calculate_factor) that indicates the behavior of the target. Based upon a comparison of the calculated factor to some predetermined value, either the first optimized version 720 or the second optimized version 730 is selected for execution. At this point monitoring is turned off and monitoring data may be cleared. Execution then proceeds using the selected optimized version. In the example of FIG. 7, each of the selected optimized versions 720 and 730 are configured to maintain an execution count (exec_count) and execute a predetermined number of times (E). As with the monitoring version, the count which is maintained may represent any suitable period of time or value. After E such executions by one of the optimized versions, monitoring is turned on again (turn on monitoring) and the execution count may be reset. The process may then repeat, alternating between monitoring with the monitoring version 710 and executing optimized versions (720, 730), as the program runs. In this manner, the program may adapt to varying behavior of the execution.

In addition to the above, the methods and mechanisms described herein may be extended to areas beyond compiler optimization to other areas such as architectural considerations. For example, multi-threading can be enabled or disabled in a given processor. Numerous such alternatives are possible and are contemplated.

Figure 8:
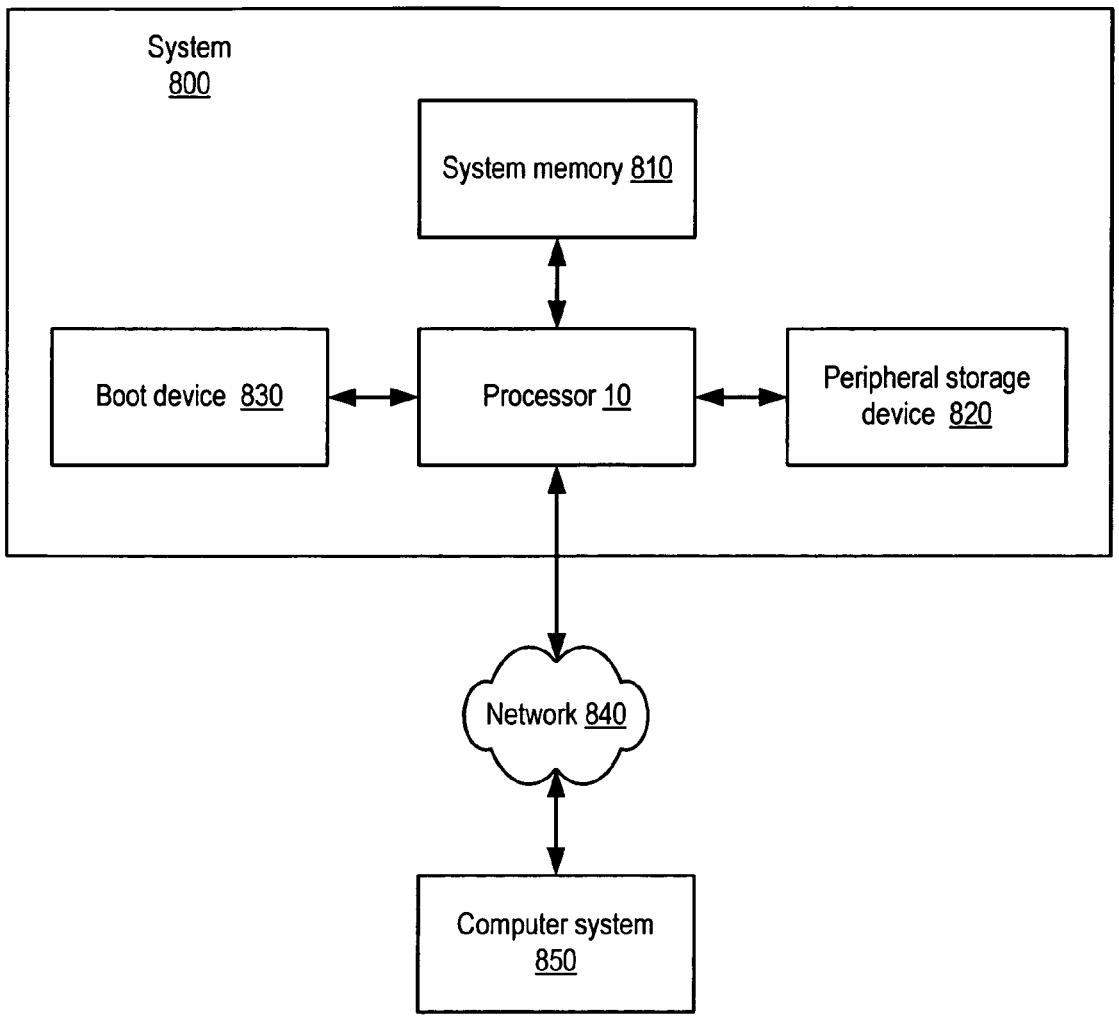
FIG. 8 illustrates one embodiment of a computing system.

FIG. 8 depicts one embodiment of a computing system 800 which may be configured to utilize the above described methods and mechanism. In the illustrated embodiment, system 800 includes a processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. Processor 10 may include processing circuitry (e.g., one or more CPUs or cores, cache memory, etc.) and may be configured to execute software which produces self-steering code. For example, processor 10 may be configured to execute compiler and related software which reads program code from memory 810 or elsewhere. The program code may be analyzed and modified as described above. An executable may then be produced based upon the modified code. Additionally, processor may be configured to execute self-steering code which has been produced (e.g., the executable produced in the discussion above). In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DDR2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

It is noted that the above described embodiments may comprise software. In such an embodiment, the program instructions which implement the methods and/or mechanisms may be conveyed or stored on a computer accessible medium. Numerous types of media which are configured to store program instructions are available and include hard disks, floppy disks, CD-ROM, DVD, flash memory, programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method executable in a computing system for generating self-steering executable code, the method comprising:
    analyzing program code;
    identifying a non-optimized portion of code in the program code;
    adding at least one optimized version of the non-optimized portion to the program code while retaining the non-optimized portion in the program code;
    adding a monitoring mechanism to the program code which is configured to monitor a behavior of the non-optimized portion of code;
    adding a selection mechanism to the program code, said selection mechanism being configured to select between two or more versions of the portion of code during runtime based at least in part on said behavior, said two or more versions including the non-optimized portion of code and the optimized version of the non-optimized portion of code; and compiling the program code with the non-optimized portion, the added optimized version, the monitoring mechanism, and the selection mechanism.

2. The method as recited in claim 1, wherein the monitoring mechanism is included in a version of the non-optimized portion of code.

3. The method as recited in claim 1, wherein monitoring said behavior of the non-optimized portion of code comprises monitoring one or more behavioral factors of the non-optimized portion of code and storing data corresponding to the monitored factors.

4. The method as recited in claim 1, wherein said selection mechanism is configured to select for execution during runtime a first version of said two or more versions during runtime and disable other versions of the two or more versions.

5. A processor comprising:
memory configured to store program code; and
circuitry configured to:
analyze program code;
identify a non-optimized portion of code in the program code;
add at least one optimized version of the non-optimized portion to the program code while retaining the non-optimized portion in the program code;
add a monitoring mechanism to the program code which is configured to monitor a behavior of the non-optimized portion of code;
add a selection mechanism to the program code, said selection mechanism being configured to select between two or more versions of the portion of code during runtime based at least in part on said behavior, said two or more versions including the non-optimized portion of code and the optimized version of the non-optimized portion of code; and
compile the program code with the non-optimized portion, the added optimized version, the monitoring mechanism, and the selection mechanism.

6. The processor as recited in claim 5, wherein the monitoring mechanism is included in a version of the non-optimized portion of code.

7. The processor as recited in claim 5, wherein monitoring said behavior of the non-optimized portion of code comprises monitoring one or more behavioral factors of the non-optimized portion of code and storing data corresponding to the monitored factors.

8. The processor as recited in claim 5, wherein said selection mechanism is configured to select for execution during runtime a first version of said two or more versions during runtime and disable other versions of the two or more versions.

9. A non-transitory computer readable medium comprising program instructions, said program instructions being operable to:
analyze program code;
identify a non-optimized portion of code in the program code;
add at least one optimized version of the non-optimized portion to the program code while retaining the non-optimized portion in the program code;
add a monitoring mechanism to the program code which is configured to monitor a behavior of the non-optimized portion of code;
add a selection mechanism to the program code, said selection mechanism being configured to select between two or more versions of the portion of code during runtime based at least in part on said behavior, said two or more versions including the non-optimized portion of code and the optimized version of the non-optimized portion of code; and
compile the program code with the non-optimized portion, the added optimized version, the monitoring mechanism, and the selection mechanism.

10. The computer readable medium as recited in claim 9, wherein the monitoring mechanism is included in a version of the non-optimized portion of code.

11. The computer readable medium as recited in claim 9, wherein monitoring said behavior of the non-optimized portion of code comprises monitoring one or more behavioral factors of the non-optimized portion of code and storing data corresponding to the monitored factors.

12. The computer readable medium as recited in claim 9, wherein said selection mechanism is configured to select for execution during runtime a first version of said two or more versions during runtime and disable other versions of the two or more versions.

* * * * *